US005752056A

United States Patent [19]
Celik

[11] Patent Number: 5,752,056
[45] Date of Patent: May 12, 1998

[54] SYSTEM FOR BINDING DOCUMENT PARTS AND HANDLERS BY FIDELITY OF PARTS OR BY AUTOMATIC TRANSLATION OF PARTS

[75] Inventor: Tantek Celik, Los Altos, Calif.

[73] Assignee: Apple Computer, Inc., Cupertino, Calif.

[21] Appl. No.: 204,520

[22] Filed: Mar. 2, 1994

[51] Int. Cl.$^6$ .................................................. G06F 17/00
[52] U.S. Cl. ............................................................ 395/778
[58] Field of Search .................................. 395/155, 163, 395/161, 162, 144–149, 157, 159, 776–778

[56] References Cited

U.S. PATENT DOCUMENTS

| | | | |
|---|---|---|---|
| 4,751,740 | 6/1988 | Wright | 382/180 |
| 4,933,880 | 6/1990 | Borgendale et al. | 395/147 |
| 4,974,194 | 11/1990 | Barker et al. | 364/419.14 |
| 5,033,008 | 7/1991 | Barker et al. | 395/148 |
| 5,140,677 | 8/1992 | Fleming et al. | 395/159 |
| 5,142,618 | 8/1992 | Fujiwara et al. | 395/146 |
| 5,146,553 | 9/1992 | Noguchi et al. | 395/146 |
| 5,226,161 | 7/1993 | Khoyi et al. | 395/650 |
| 5,243,691 | 9/1993 | Kuwabara | 395/112 |
| 5,299,304 | 3/1994 | Williams et al. | 395/148 |
| 5,408,599 | 4/1995 | Nomura et al. | 395/147 |
| 5,414,806 | 5/1995 | Richards | 395/155 |
| 5,421,012 | 5/1995 | Khoyi et al. | 395/650 |
| 5,495,595 | 2/1996 | Peters et al. | 395/500 |

FOREIGN PATENT DOCUMENTS

| | | |
|---|---|---|
| 0 173 125 | 3/1986 | European Pat. Off. . |
| 0215203A3 | 3/1987 | European Pat. Off. . |
| 0513553A2 | 11/1992 | European Pat. Off. . |
| 0 530 122A1 | 3/1993 | European Pat. Off. . |
| WO92/08199 | 5/1992 | WIPO . |

OTHER PUBLICATIONS

Lin, Jin–Kun, "A Multimedia and Multisource Document Editor of an Open Architecture", SIGDOC '92, pp. 57–62, Oct. 1992.

UIST Fourth Annual Symposium on User Interface Software and Technology, "Embedded Buttons: Documents as User Interfaces", Nov. 11–13, 1991, pp. 45–53.

Berry, R.E., "The Designer's Model of the CUA Workplace", *IBM Systems Journal*, vol. 31, No. 3, pp. 429–458, Apr. 1992.

"Implementing Implicit Drag Along Without Regard to Object Set Type", *IBM Technical Disclosure Bulletin*, vol. 27, No. 10A, Mar. 1985, p. 5518.

Olsen, D.R. et al., "Workspaces: An Architecture for Editing Collections of Objects", *CHI'92 Conference Proceedings*, May 7, 1992, Monterey, California, pp. 267–272.

"Common Editing Arrangement for Different Object Types in Text Processing", *IBM Technical Disclosure Bulletin*, vol. 27, No. 9, Feb. 1985, pp. 5049–5052.

"Dragging Marked Data to an Editor Window", *IBM Technical Disclosure Bulletin*, vol. 34, No. 10B, Mar. 1992, pp. 202–203.

*Primary Examiner*—Joseph R. Burwell
*Attorney, Agent, or Firm*—Burns, Doane, Swecker & Mathis, L.L.P.

[57] ABSTRACT

A computer–human interface employs parts as the basic structural elements of documents. At the time a part is opened, an editor is bound to the part in a manner which makes most efficient use of programs available on the computer. The binding system first determines whether the preferred editor for the part is available on the computer. If so, that editor is bound to the part and launched, if it is not already running. If the preferred editor is not available, the system attempts to locate the most suitable handler for the part, based upon various characteristics of the part's contents, such as their category and kind. If a suitable editor or other handler is available on the computer, it is bound to the part and launched. If necessary, the part is translated from one kind into another kind for which an editor is available. If no editor suitable for the part can be located within the computer's available programs, a handler of last resort is bound to the part as its editor. A handler of this type is a generic tool which allows the part to be presented to the user, without offering all of the functions that are normally associated with an editor for manipulating the part's particular type of contents.

28 Claims, 11 Drawing Sheets

SYSTEM FOR BINDING DOCUMENT PARTS AND HANDLERS BY FIDELITY OF PARTS OR BY AUTOMATIC TRANSLATION OF PARTS

FIELD OF THE INVENTION

The present invention is directed to a computer-human interface architecture of the type in which parts form the fundamental building blocks for documents, and more particularly to a system for binding an editor to a part when the part is opened.

BACKGROUND OF THE INVENTION

A computer-human interface architecture, of the type in which parts form the fundamental building blocks for documents, is described in application Ser. No. 08/058,260, filed May 10, 1993. A part is a self-contained entity that is comprised of two primary components, its content and a manipulator or handler for that content. Generally, the handler will be an editor that provides the necessary functions for adding to, deleting and otherwise modifying some or all of the contents of the part. For example, if the part comprises a textual document, its contents are the text, and the editor which is a component of that part can be word processing software that enables the user to edit the text. Alternatively, the handler which forms a component of the part can be a viewer, which enables the user to view the part's contents but does not provide functions which allow for editing.

In an architecture of this type, the part's contents do not exist by themselves. Rather, they are always associated with a handler whenever the part is active. In other words, when a part is opened, the handler which forms a component of the part is also opened, and running in the background, so that its functions are available to the user.

Every part has certain properties associated with it. One of these properties is an identification of the preferred editor for that part. When a part is first created, the program that was used to create the part is typically identified as its preferred editor. For a textual part, for example, the preferred editor may identify the particular word processing program that was used to create the document. This property is stored with the part. Whenever the part is subsequently opened, the word processing program is launched, so that its functionality is available as the user accesses the contents of the part.

It may be the case that a part is transferred from one computer system to another which does not contain the preferred editor for the part. Alternatively, the preferred editor may be removed from the system, e.g. it may have been available on a trial basis and the trial period expired. In these cases, a different handler, which is available on the system, must be assigned to the part. Accordingly, it is desirable to provide a system which assigns the most suitable available handler to a part so that its functionality is available whenever the part is accessed. This process of assigning a handler to a part is known as binding.

SUMMARY OF THE INVENTION

The present invention provides a system for binding a handler to a part in a manner which makes most efficient use of programs available on the computer. The binding operation can take place when a part is opened, or at any other suitable time determined by the need to access the handler's functionality. In the binding operation, the system of the present invention first determines whether a preferred editor for the part is available on the computer. If so, that editor is bound to the part and launched, if it is not already running. If the preferred editor is not available, the system of the present invention locates the most suitable handler for the part, based upon various characteristics of the part's contents, such as their category and type. If a suitable editor or other handler is available on the computer, it is bound to the part and launched. If no handler suitable for the part can be located within the computer's available programs, a determination is made whether the part can be translated into another type for which a handler is available. If so, the part is translated and a handler is bound to it. Otherwise, a handler of last resort is bound to the part as its editor. A handler of this type is a generic tool which allows the part to be presented to the user, without offering all of the functions that are normally associated with an editor for manipulating the part's particular type of contents.

Further features of the invention are explained hereinafter with reference to a preferred embodiment illustrated in the accompanying drawings.

DETAILED DESCRIPTION

To facilitate an understanding of the present invention, a computer-human interface which employs parts as the fundamental component of documents will first be described. In the particular example described herein, an interface which is suitable for a Macintosh® brand computer, manufactured by Apple Computer, Inc., is illustrated. It will be appreciated, however, that the principles of the present invention are not limited to this particular example.

Figure 1A:
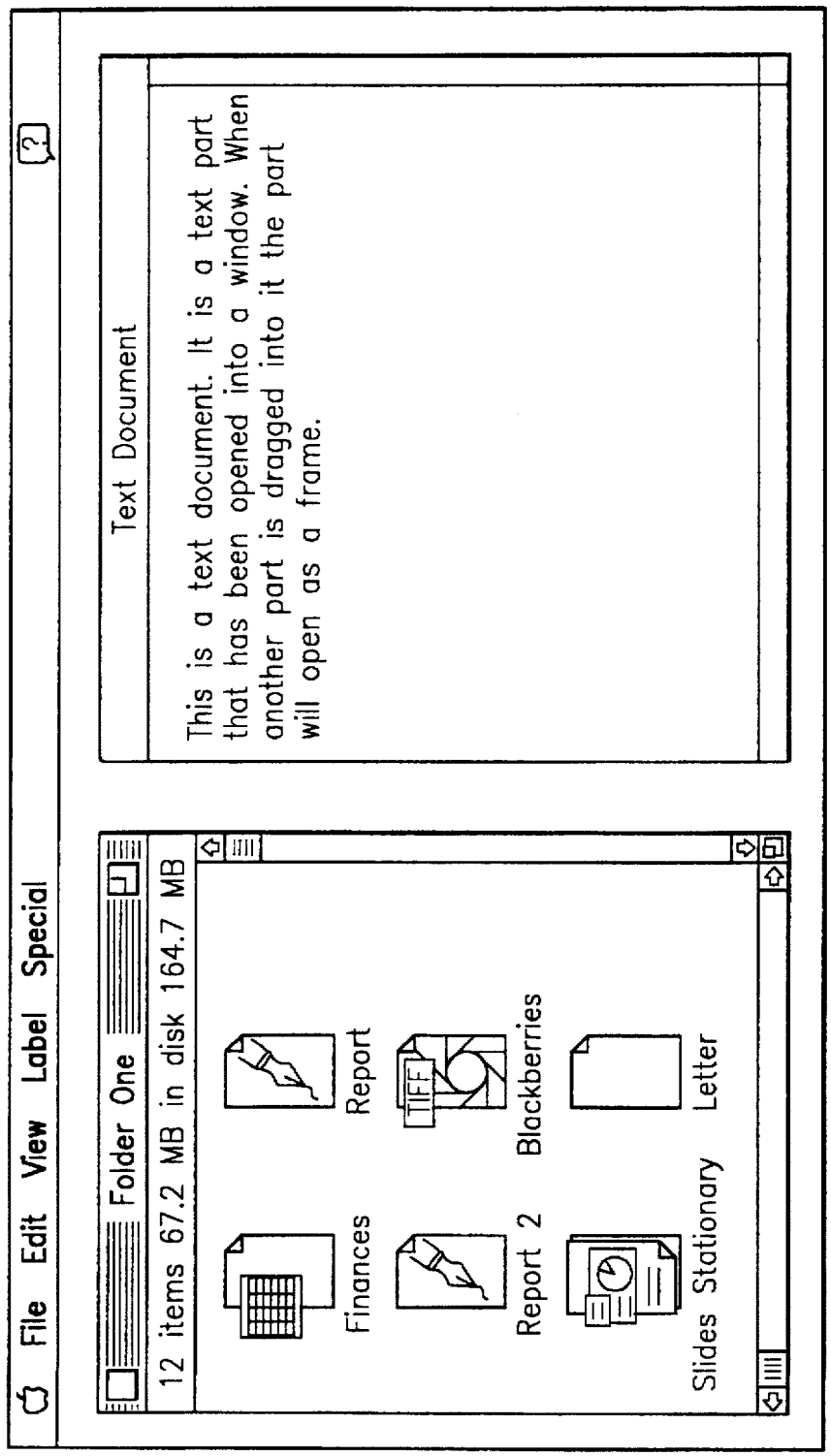
FIG. 1A and 1B are illustrations of screens that might be generated by a graphical interface that employs parts.
Figure 1B:
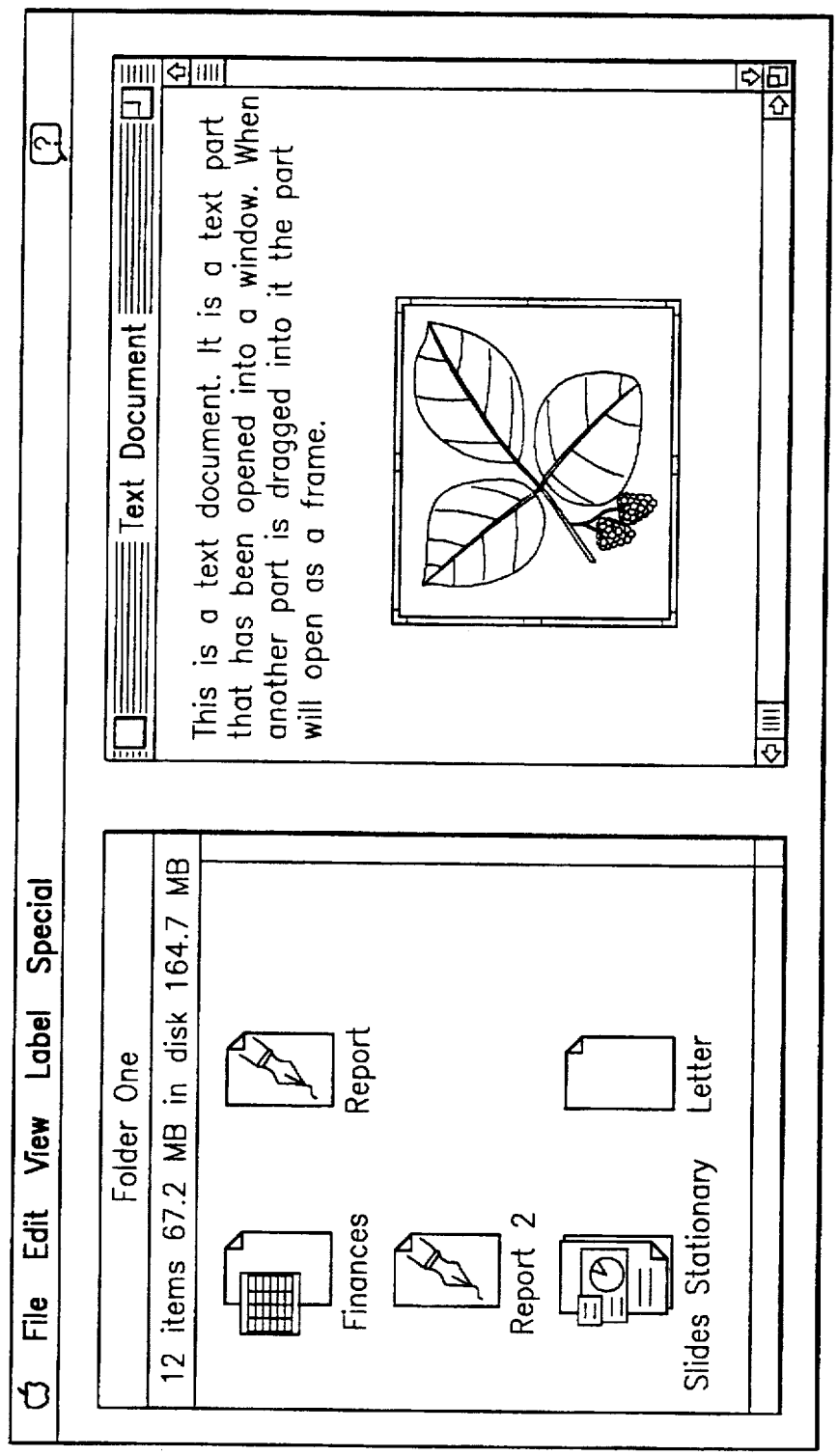

FIGS. 1A and 1B illustrate views of screens that might be presented to a user via a computer-human interface which employs parts. These screens depict a desktop 34 which defines a workspace 36. Also included on the desktop is a menu bar 38. Within the workspace 36 are two windows, 40 and 42. The lefthand window 40 is a folder window which contains icons representing various parts. As shown in FIG. 1A, three icons 44 pertain to text parts, a fourth icon 45 represents a graphic part and another icon 46 represents a spreadsheet part. A sixth icon 48 is a stationery icon representing a part that can be used for the creation of presentation slides. In FIG. 1A, the righthand window 42 contains a text document. More particularly, the document includes a text part 50. This text part can be created by typing text within the window 42, or by opening in the window a previously created text part that was represented by an icon.

FIG. 1B illustrates the result of an operation in which the graphic icon 45 has been dragged from the folder in the left window 40 to the text document in the right window 42. As is known in user interfaces which employ a desktop metaphor, such as that shown in FIGS. 1A and 1B, dragging is an operation in which objects can be moved or copied on the desktop and within windows through the actuation of a suitable cursor control device, such as a mouse. Once the graphic icon is placed within the document, its contents are displayed in a frame 52. Since the document now contains a graphic component as well as text, it is referred to as a compound document.

In a compound document, different program executables, e.g. editors, cooperate to produce the appearance of a single unified piece of information. Each such executable controls one segment, i.e. part, of the total information content of the document. Containment is used to relate the parts of the document to one another. Containment represents a logical relationship in which the user expects the contained, or embedded, part to move with and be affected by the container part. The text 50 and the graphic element within the frame 52 pertain to separate respective parts which together make up the compound document. The graphic part is contained within the text part in this particular example.

A part is a self-contained entity which is comprised of content and a manipulator or handler for that content. These two components are always available when the part is accessed, regardless of where it is located on the desktop. Thus, when the graphic icon 45 is located in the folder of window 40, as in FIG. 1A, it represents a part comprising a graphic element and an editor for that element. When the part is moved to the document in the window 42, its contents go with it, and the functionality of an editor for those contents is immediately available to the user.

The significance of this feature is the fact that the contents of a part can always be edited, or otherwise manipulated, wherever they are located. Thus, in the compound document of FIG. 1B, the textual content 50 can be edited within the document, for example by using the same word processor that was used to originally create the text. Since the graphic editor is present as a component of the part represented by the frame 52, it enables the graphical contents of the part to be directly edited in place. Thus, it is not necessary for the user to open a separate graphics application, for example in another window on the desktop 34, edit the graphical information as desired, and then export the edited graphics into the document in the window 42. Rather, the user can directly edit the contents of the frame 52 within the context of the document in the window 42, without having to implement any intervening steps. The user is able to focus on document content, rather than the application program, and can take advantage of the context provided by the surrounding document.

The part, therefore, is a self-contained object which is autonomous of the underlying system technology. It can be used in any type of software engine or environment, and the user is not required to learn the operation of a particular editor for the part. As long as an editor suitable for that part is represented in the underlying system, the user can take full advantage of the part's capabilities. Furthermore, if a text part was created with a particular text editor (word processor), the user is not constrained to use only that text editor with the part. If the user has more familiarity with the commands of a different word processor, for example, that word processor can be designated as the preferred editor for all text parts in the document or the computer system.

The editor, or other handler, for a part is analogous to an application program in a conventional computer system. It is a software component which provides the necessary functionality to display a part's contents and, where appropriate, present a user interface for modifying those contents. It may include menus, controls, tool palettes and other user interaction facilities. For a part which is capable of containing other parts, its editor takes these contained parts into consideration when displaying its content. For example, a text editor may wrap its part's contents so that they do not appear within an embedded graphic part.

A part has a number of properties associated with it. One of these is its preferred editor. For example, when a part is first created, the program that was used to create the part can be identified as its preferred editor. Thereafter, the preferred editor can be changed. Typically, such a change might be made by the user, to conform with the user's preferences. Alternatively, or in addition, the changing of the preferred editor might be done automatically by the system, for example to conform with the system defaults.

Another property of a part is its type, or kind. The various kinds of parts can be classified in different categories. Generally speaking, a category identifies one of several generic classes of information for the part's contents, such as text, graphics, spreadsheet, etc. The kind property indicates one or more characteristic features of the contents. For example, the kind might indicate an attribute of the contents (italicized letters), the data format (PICT or TIFF files), or other salient features, such as the particular word processor that was used to create text, which inherently identifies the formatting and other control codes associated with the text.

More detailed information regarding parts, and graphical interfaces which are based upon parts, can be found in the above-identified U.S. application Ser. No. 08/058,260, the disclosure of which is incorporated herein by reference.

In order to use the functions provided by a conventional application, the program must be launched and running. In other words, it must be stored in the computer system's main memory. In a similar manner, in an interface which is based upon document parts, the editor for a part must be running in the system's memory or otherwise accessible to the computer's CPU when the part is accessed by the user. To do so, the editor must be installed on the system. For example, it can be stored in a folder or subdirectory of permanent memory, such as a hard disk, and called when an associated part is accessed. To conserve system resources, all installed editors may not be loaded into the system memory at all times. Rather, they can be launched as needed. For example, an editor for a part can be launched when the part is dragged into a document, since this is the time that the editing capabilities are most likely to be needed.

Accordingly, whenever access to the contents of a part is required, it is desirable to associate an editor with that part. The process of associating a specific editor with a part is known as binding. Typically, binding is carried out when the part is first opened, and the editor remains bound to the part as long as the part remains open. Alternatively, it may be desirable to bind an editor to a part at other times. For example, binding might be carried out when a window containing the part is made active, even if the part itself has not yet been opened within the window.

Of course, it is unlikely that every possible editor will be available on every computer system in which a part can be accessed. For example, a textual document might be created on one computer system, using a particular word processing program. The preferred editor for that part, therefore, is the word processor that was used to create it. It is possible that the part will be transferred to another computer which employs a word processing program different from the one used to originally create the part. Accordingly, when the part is accessed on this latter computer system, the preferred editor for the part is not available. In such a case, it is necessary to identify another editor, from those available on the system, which is suitable for binding to the part.

The present invention is directed to a procedure for locating the most suitable handler for a part from those available on the computer system, and binding that handler to the part. An overview of the general procedure for binding an editor to a part, in accordance with the present invention, is illustrated in the flow chart of FIG. 2. Details of particular steps within this general procedure are illustrated in the flow charts of the subsequent figures.

The binding procedure can be carried out whenever there is a need to associate a handler with a part. Typically, this will take place when a part is first opened after being in a closed or hidden state. This may occur, for example, in response to an event flag that is generated when a mouse button is depressed, or it could be a step in a script. Other suitable times for binding a handler to a part might be when the part is first loaded into a system, when a window containing the part is opened, or when the part is dragged into an active document.

Figure 2:
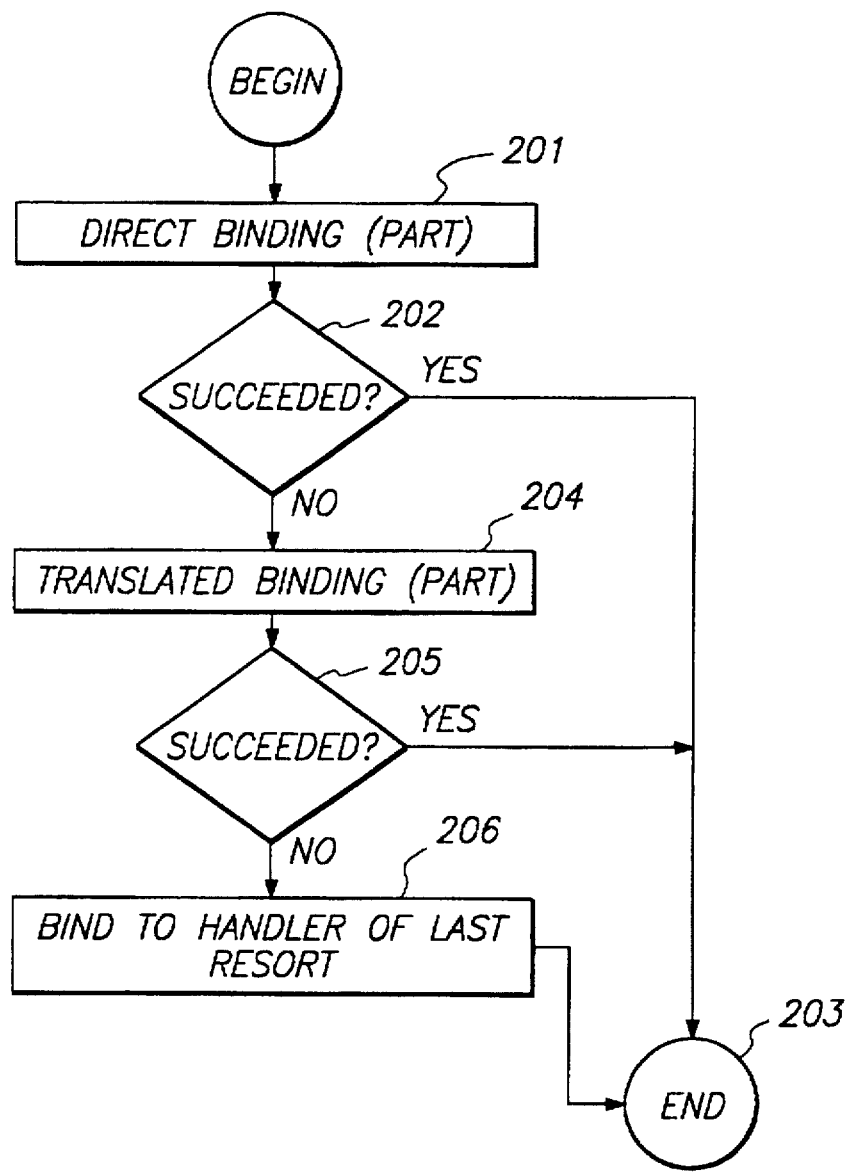
FIG. 2 is a flow chart depicting the basic process for the binding system of the present invention.

Referring to FIG. 2, once an appropriate event that initiates binding has been detected, the system of the present invention first carries out a routine known as Direct Binding (Step 201). In Direct Binding, an attempt is made to locate the preferred editor for a part or, if the preferred editor is not available, another handler which supports one of the kinds of contents in the part. When a suitable handler is located, it is bound to the part. If there are no available parts handlers which satisfy the appropriate criteria, Direct Binding cannot be accomplished. At Step 202, a determination is made whether the Direct Binding routine has been successful. If so, the system returns to the program which called the binding process (Step 203).

If the Direct Binding routine was not successful (a negative response at Step 202), a procedure is carried out to perform Translated Binding (Step 204). In this process, an attempt is made to translate the contents of the part into a kind for which a handler is available. If such a procedure is feasible, the part is translated and an available handler is bound to the translated part. If the results of this procedure are successful, as determined at Step 205, the system returns at Step 203. If, however, the response is negative at Step 205, i.e. the Translated Binding routine was unsuccessful, the system binds the part to a handler of last resort at Step 206. The handler of last resort is a program executable that enables the part to be presented to the user. Depending on the handler's functionality, it may enable the contents of the part to be displayed. Otherwise, the part is displayed as an empty box, to enable the user to visualize its location within the overall document. For instance, if a handler of last resort is employed for the graphic part in the example of FIG. 1B, the outline of the frame 52 might be displayed, but none of the internal contents would be shown. The handler of last resort may also provide certain limited information about the part, such as the particular kinds into which the part can be explicitly translated.

Figure 3:
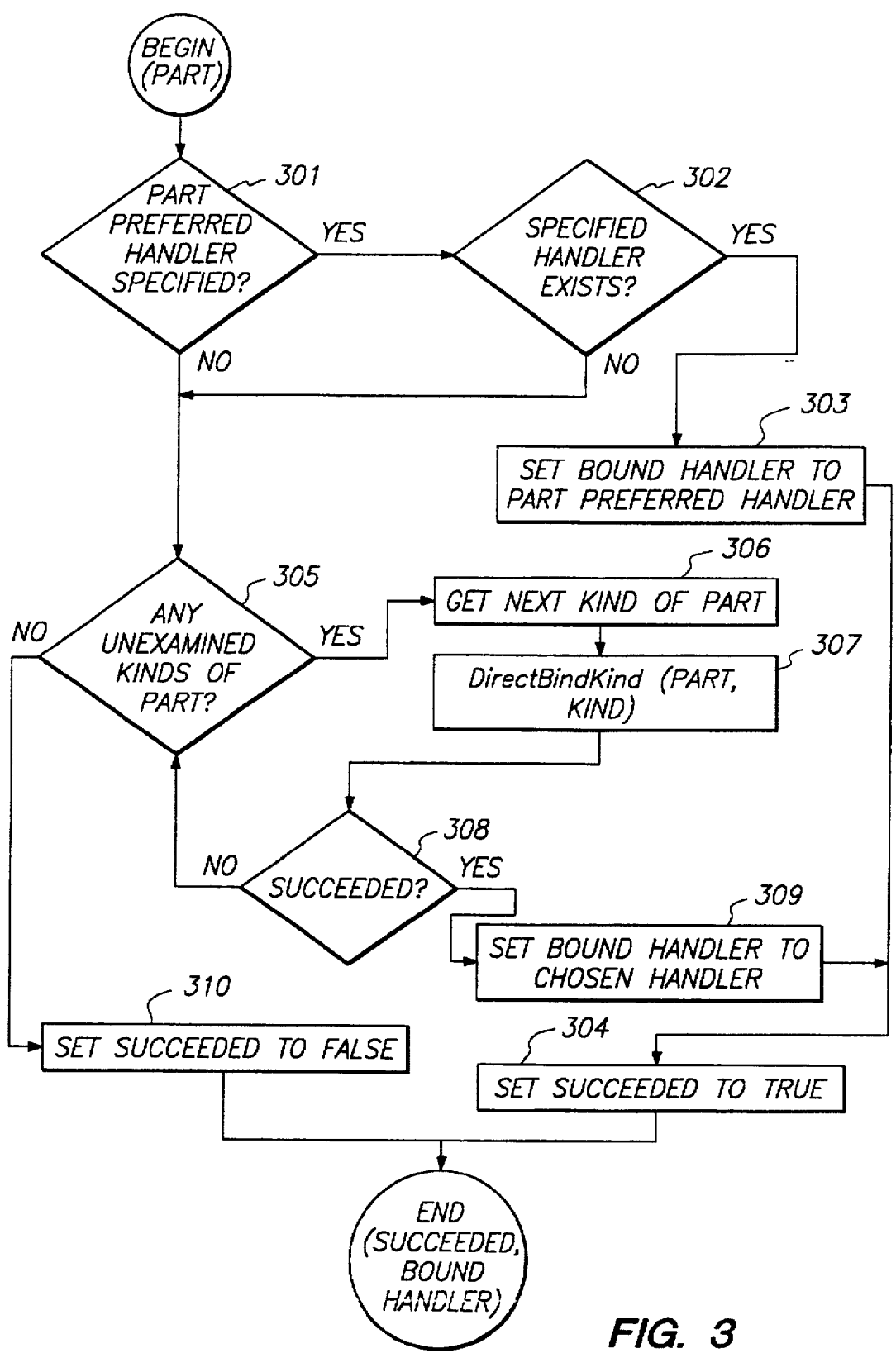
FIG. 3 is a flow chart depicting the steps of the direct binding routine.

Referring to FIG. 3, the Direct Binding routine of Step 201 is illustrated in greater detail. At Step 301, the system determines whether a preferred handler is specified for the part. If so, at Step 302 a determination is made whether the preferred handler is available on the computer system. If so, at Step 303 that handler is identified as the bound handler for the part. For example, a unique string which identifies the handler can be returned to the program which called the binding process This string can be stored as a local variable for further reference whenever the part is accessed. An appropriate flag is set at Step 304 to indicate the success of the direct binding routine, and the system returns to Step 202 in the flow chart of FIG. 2.

If the preferred handler is not specified at Step 301, or cannot be located at Step 302, the system determines what kind of data is contained in the part. If the part is comprised of multiple kinds, one of the kinds is selected (Steps 305 and 306). Preferably, the kinds are selected in order of their fidelity. In this regard, every handler has associated therewith a listing of preferred kinds and categories for that editor. Different kinds and categories of data can be said to represent the same information, but some may be qualitatively better or worse than others when the functionality of the editor is considered. A qualitatively better kind of data is identified as being of higher fidelity. There is no predetermined ordering of kinds of data by fidelity. Rather, fidelity is always determined by a particular context. Editors may be able to support many different kinds of data, and therefore a suitable data structure stores a list of those kinds of data associated with a particular editor, in order of fidelity. For example, a word processing program can typically handle different kinds of text. The fidelity ordering of these different kinds could be (1) rich text, (2) style text, (3) plain text, etc.

Every part, therefore, has its different kinds of data listed in order of fidelity. This ordering is determined by the editor that was last bound to the part. At Step 306, the kinds of data are selected in order of fidelity. After one of the kinds of data for the part has been selected, the system performs a routine labelled Direct Bind By Kind at Step 307. In this routine, the system determines whether a handler is present that supports the selected kind. If so, that handler is identified as the bound handler for the part (Steps 308 and 309), and the success flag is set at Step 304. If the routine at Step 307 is not successful in locating a handler for that kind of part, the system returns to Step 305 to determine whether the part contains another kind of contents which has not yet been examined. If so, the Direct Bind By Kind routine of Step 307 is repeated for that kind of contents. This process continues until a handler can be located for one of the kinds of contents of the part. If no handler can be found for any of the part's kinds, the process proceeds to Step 310, in which the success flag is reset to a false condition, and the system returns to Step 202.

Figure 4:
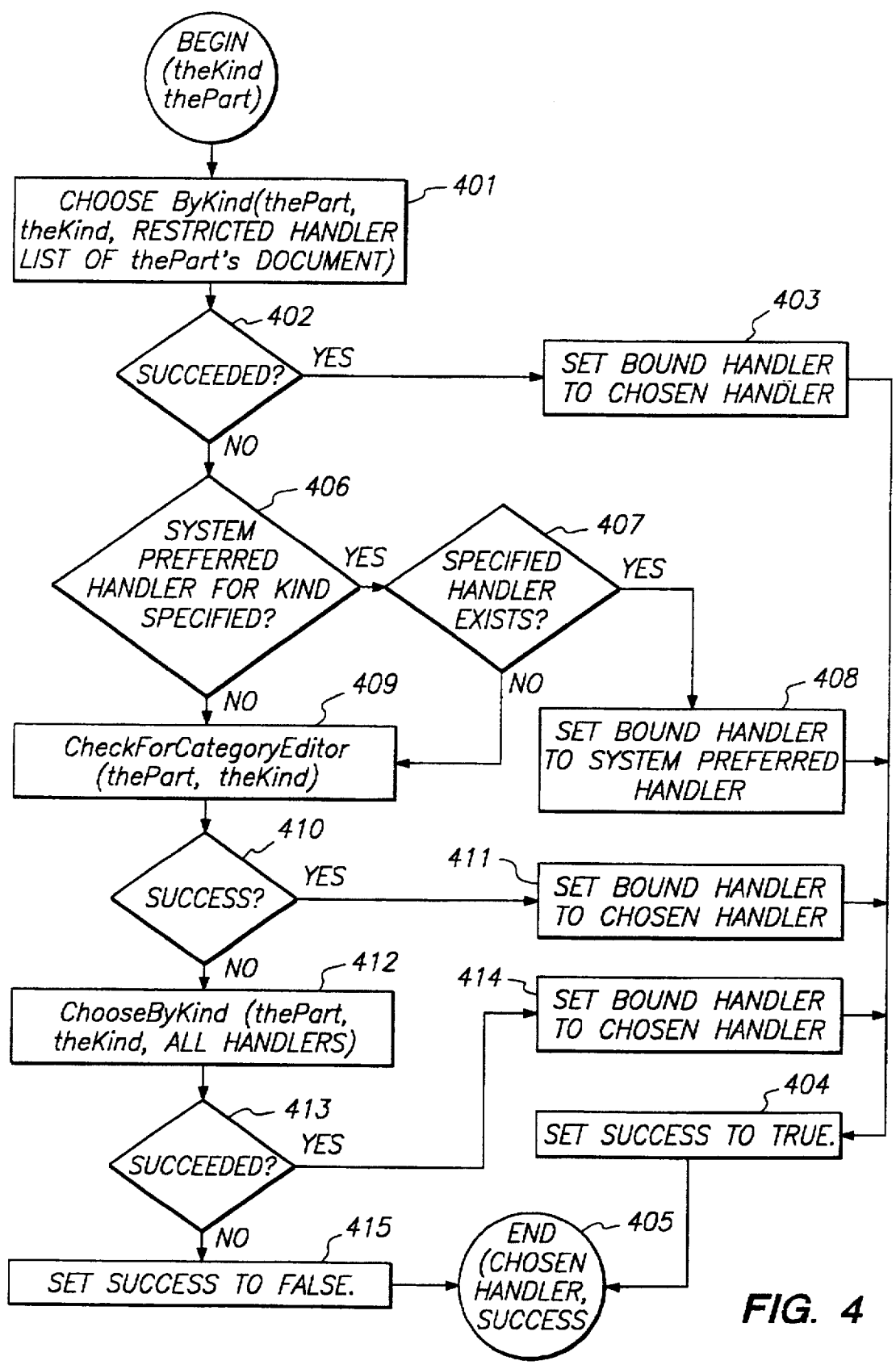
FIG. 4 is a flow chart depicting the steps of the procedure for directly binding by the kind of part.

The Direct Bind By Kind subroutine of Step 307 is illustrated in detail in the flow chart of FIG. 4. Referring thereto, each document (which can contain one or more parts) has associated with it a restricted list of handlers. This list is formed when the user chooses a set of handlers that are preferred for that document. At Step 401, the system carries out a subroutine labelled Choose By Kind. In this subroutine, the system determines whether any of the handlers in the document's restricted list support the kind of part that was selected at Step 306. If so, one of the handlers which supports the selected kind is chosen, using any suitable procedure. For example, the suitable handlers can be chosen by sorting them in alphanumeric order and choosing the first handler in the list.

If the Choose By Kind subroutine was successful in selecting a handler, that handler is bound to the part at Step 403, and the success flag is set at Step 404. Thereafter, the process returns to Step 308.

If the subroutine of Step 401 was not successful in choosing a handler, a determination is made at Step 406 whether a preferred handler for the selected kind of part has been identified for the underlying computer system. For example, when a user first configures the computer system, he may identify preferred editors for each kind of part. Alternatively, preferred handlers might be automatically selected by the computer system, or some other suitable procedure might be carried out to identify preferred handlers. If a preferred handler has been specified, the system determines at Step 407 whether that handler currently exists in the system. If so, the handler is bound to the part at Step 408, and the process continues after setting the success flag at Step 404.

Figure 5:
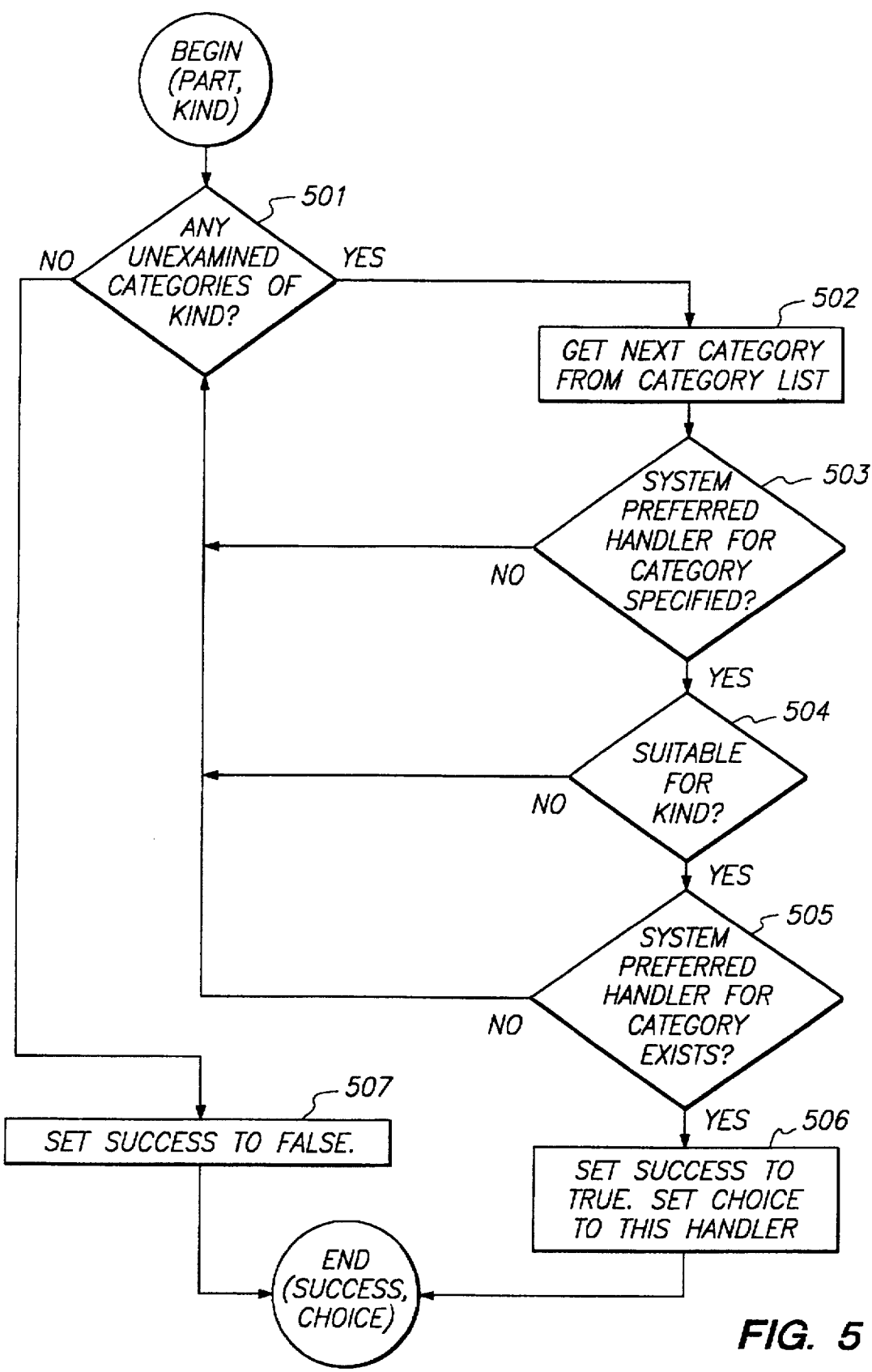
FIG. 5 is a flow chart of the process for locating a category editor.

If there is no specified preferred handler, or if it does not currently exist on the system, a subroutine is carried out at Step 409 to determine whether a handler is available according to a category of the part. The details of this subroutine are illustrated in the flow chart of FIG. 5. Referring thereto, in this subroutine, a handler is chosen on the basis of the various categories associated with the selected kind of part. More particularly, every kind of part is associated with at least one category, although some kinds of parts may be associated with more than one category. At Steps 501 and 502, one of the categories associated with the selected kind of part is chosen, and at Step 503 a determination is made whether the computer system has a preferred handler for that category of part. If so, a determination is made at Step 504 whether that preferred handler is appropriate for the selected kind of part, i.e., whether its functionality supports that kind of part. If so, a determination is made at Step 505 whether that handler currently exists in the system. If so, the handler is selected at Step 506, and the success flag is set. If no handler is chosen as a result of this process, the system returns to Step 501, to determine whether the selected kind of part is associated with any other categories. If so, the process is repeated until a handler is selected or all the categories have been exhausted. If it is not possible to choose a handler for any of the categories, the success flag is reset at Step 507, and the process proceeds to Step 410 in the flow chart of FIG. 4.

Figure 6:
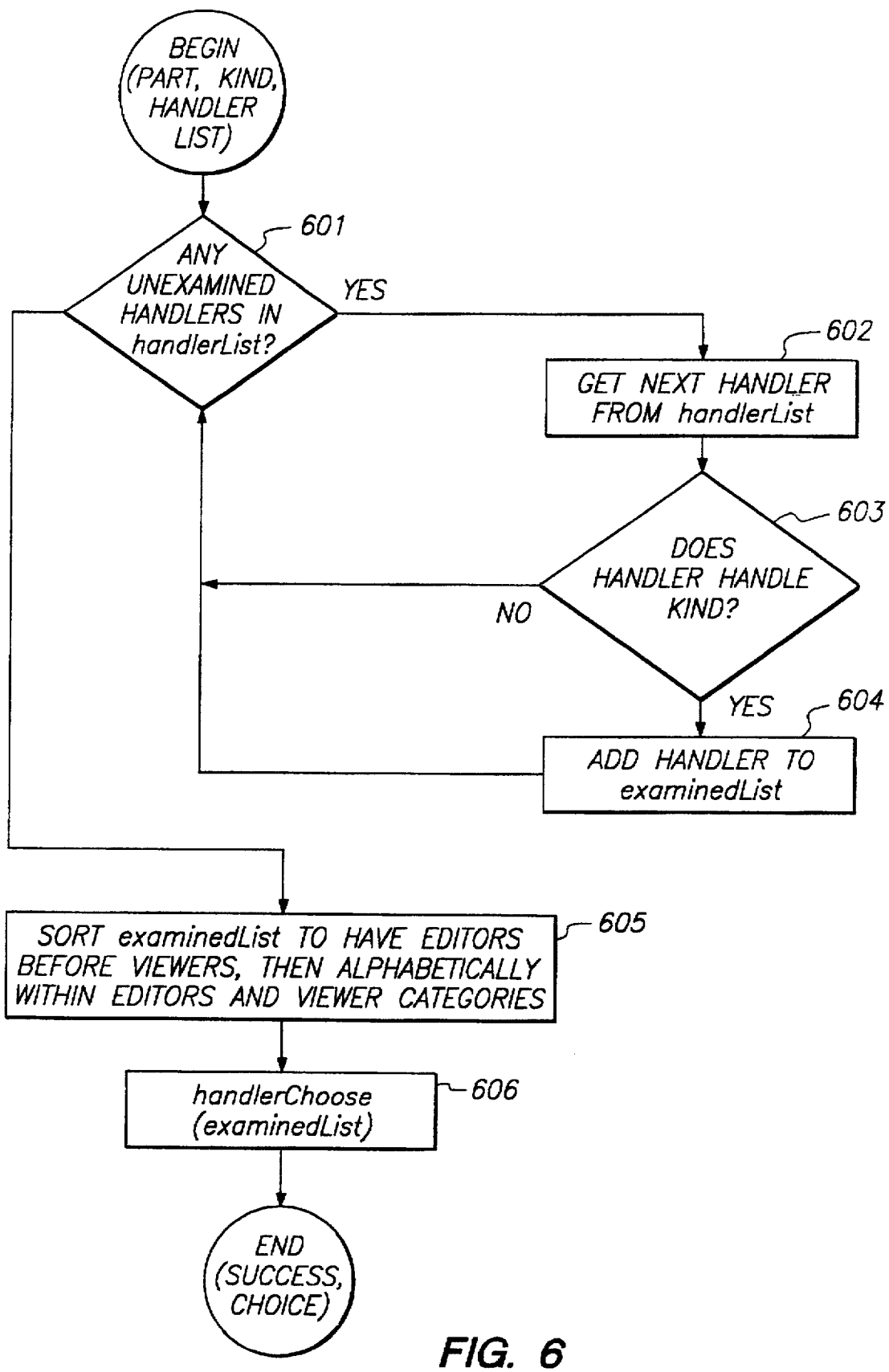
FIG. 6 is a flow chart of the subroutine for choosing a handler based on the kind of part.

Referring again to FIG. 4, if the subroutine of Step 409 was successful, the chosen handler is bound to the part at Step 411, and the success flag is set at Step 404. Otherwise, the process proceeds to the subroutine of Step 412. In this subroutine, an attempt is made to locate any handler which will support the selected kind. The details of the subroutine are illustrated in FIG. 6. Referring thereto, at Steps 601 and 602 the system selects a handler from all of those currently available on the computer system. At Step 603, a determination is made whether this handler is appropriate for the selected kind of part. If it is, this handler is added to a temporary list of examined handlers (Step 604). Steps 601–604 are repeated until all handlers currently available on the computer system have been examined relative to the selected kind of part, to create the temporary list. Then, at Step 605, the list of examined handlers is sorted so that editors are placed before viewers, and within each of these two categories the handlers are arranged alphabetically, or in any other suitable order. Thereafter, at Step 606, one of the handlers is chosen from those on the list, for example, the handler at the top of the list. The process then returns to Step 413 in the flow chart of FIG. 4. If the subroutine is successful in choosing a handler, that handler is bound to the part at Step 414, and the success flag is set at Step 404. If no handler was chosen as a result of the Direct Bind By Kind routine of FIG. 4, the success flag is reset at Step 415, and the system returns to Step 308 of the flow chart of FIG. 3.

Figure 7:
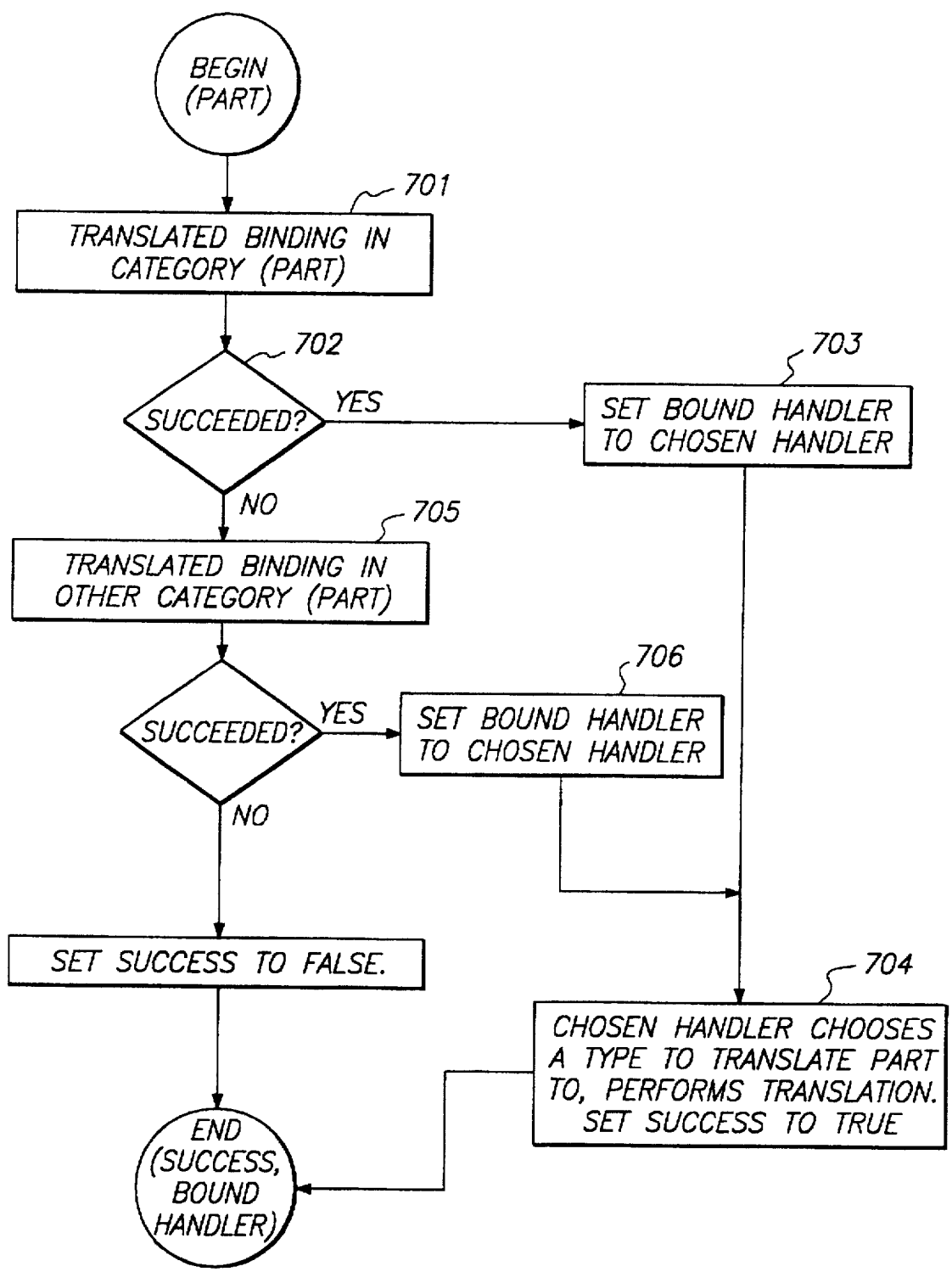
FIG. 7 is a flow chart of the routine for translated binding.
Figure 8:
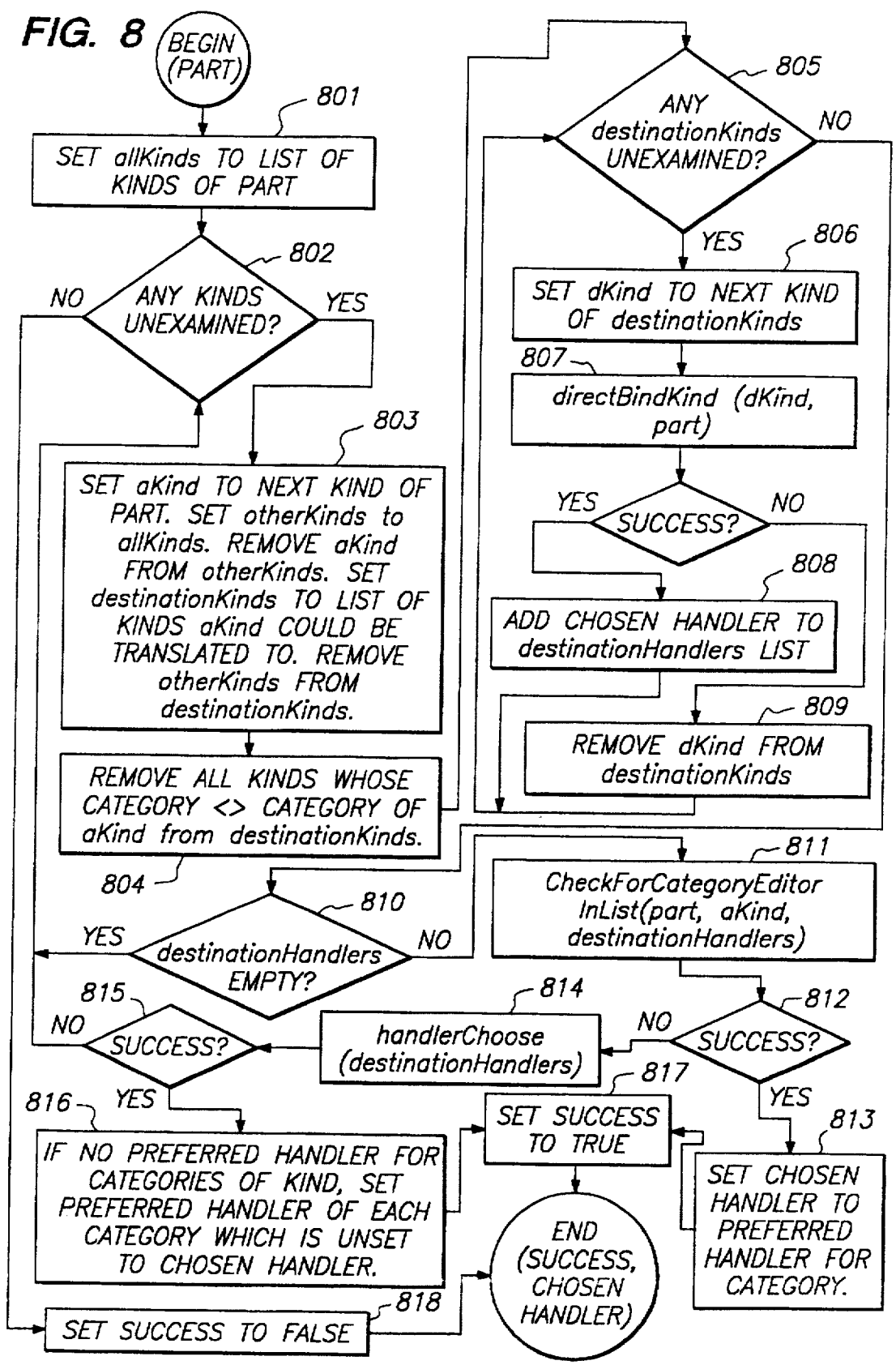
FIG. 8 is a flow chart of the subroutine for translated binding according to a selected category.

If, after examining all of the kinds for the part, the Direct Binding routine is not able to select a handler, the Translated Binding routine of Step 203 is carried out. The process of this routine is illustrated in the flow chart of FIG. 7. As a first step of the Translated Binding routine (Step 701), the system carries out a subroutine in which translation is implemented with respect to a specified category. The steps of this subroutine are illustrated in FIG. 8. Referring thereto at Step 801 the kinds of the part are stored in a list, labelled "all kinds". At Steps 802 and 803, one of the kinds in this list is selected, and the remaining entries in the lists are stored in a second list, labelled "other kinds". The system identifies the kinds of parts into which the selected kind can be translated. This may be determined, for example, by translators which are available on the computer system. These identified kinds of parts are stored in a list of destination kinds. The kinds of parts which are stored in the other kinds list are removed from the list of destination kinds. The reason for removing the kinds of parts on the list of other kinds from the list of destination kinds is due to the fact that these other kinds of parts have already been examined for the existence of a suitable handler during the Direct Binding routine. By virtue of the fact that the translated binding routine is now being carried out, a determination has previously been made that no suitable handler exists for the kinds of parts in the list of other kinds. Accordingly, there is no need to further examine these kinds of parts in the Translated Binding routine.

At Step 804, the various categories associated with the selected kind are identified. The entries in the list of destination kinds are examined, and if any of the kinds in this list do not have an associated category which is the same as one of the categories for the selected kind, they are also removed. The list of destinations kinds therefore comprises all of the kinds into which the selected kind can be translated, and which have at least one category in common with the selected kind and which do not appear on the list of other kinds.

At Steps 805 and 806, one of the kinds of parts on the list of destination kinds is selected, and at Step 807 the Direct Bind By Kind subroutine is carried out, as described previously with respect to the flow chart of FIG. 4. If the subroutine is successful in locating an available handler, that handler is added to a list of destination handlers at Step 808. Alternatively, if no handler was found, the selected destination kind is removed from the list of destination kinds at Step 809. The process then returns to Step 805, to determine whether any other destination kinds remain to be examined. The result of this process is to create a list of all handlers on the system which are suitable for the possible destination kinds into which the part of interest can be translated.

Figure 9:
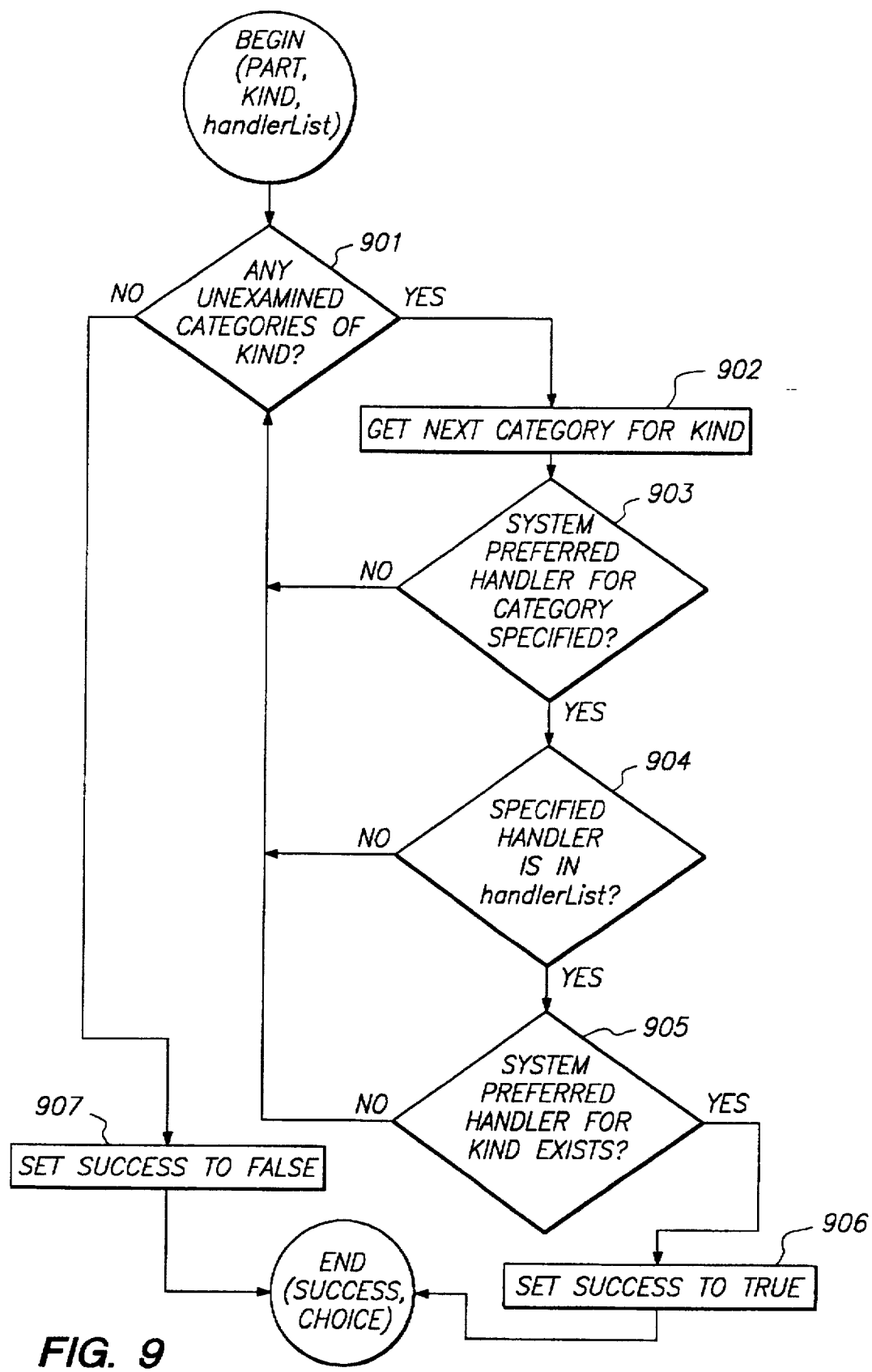
FIG. 9 is a flow chart of the subroutine for locating a category editor within the handler list.

After all of the destination kinds have been examined, the system makes a determination, at Step 810, whether the list of destination handlers is empty. If not, i.e., at least one handler was located as a result of the Direct Bind By Kind subroutine, the system proceeds to Step 811. At this step, a subroutine is implemented to choose one of the destinations handlers on the basis of categories. The steps of this subroutine are illustrated in the flow chart of FIG. 9. Referring thereto, at Steps 901 and 902 one of the categories for the selected kind of part (as it identified at Step 803) is chosen. At Step 903, a determination is made whether a system preferred editor has been identified for that category. If so, at Step 904 the system determines whether that handler can be found on the list of destination handlers established at Step 808. If so, at Step 905 a check is made to determine whether the chosen handler currently is present in the computer system. If the handler can be found, this handler is chosen and the success flag is set at Step 906. The system then returns to the subroutine of FIG. 8, where the state of the success flag is recognized at Step 812 and the chosen handler is established as the preferred handler for the selected category in Step 813.

If no handler is found for the first selected category, the system returns to Step 901, to choose another category and determine whether a system preferred handler can be found for that category. The process loops through Steps 902–905 for each category until a handler is found. If no handler is found after all of the categories have been exhausted, the success flag is set to false at Step 907.

If no handler is chosen as a result of this subroutine, the system proceeds to Step 814, where one of the handlers on the list of destination handlers is chosen, in accordance with any preferred procedure. For example, as described previously, the list of handlers can be sorted in alphanumeric order, and the handler at the top of the list chosen for further processing.

Once a handler is chosen at Step 814, the list of destination kinds is examined to determine which kind is considered to have the highest fidelity by the chosen editor. The categories associated with this highest fidelity kind are identified, and a determination is made whether there is a system preferred editor for each category. If any of the categories does not already have a system preferred editor, the chosen editor is set to be the system preferred editor for that category, at Step 816. Thereafter, the success flag is set at Step 817, and the process returns to Step 702. Since the success flag is set, the affirmative response at Step 702 causes the system to proceed to Step 703, where the chosen handler is bound to the part. Thereafter, at Step 704 the part is translated into the kind on the list of destination kinds which the chosen handler considers to have the highest fidelity.

Referring again to FIG. 8, if the list of destination kinds is found to be empty at Step 810, or a handler is not chosen at Step 814, the system returns to Step 802, to determine whether the part has any other associated kinds which have not yet been examined. If so, the process is repeated for another kind. If a handler cannot be chosen after all kinds have been examined, the success flag is reset at Step 818, and it is checked at Step 702. Since a handler was not chosen, the system proceeds to the subroutine of Step 705, which is illustrated in detail in FIG. 10.

Figure 10:
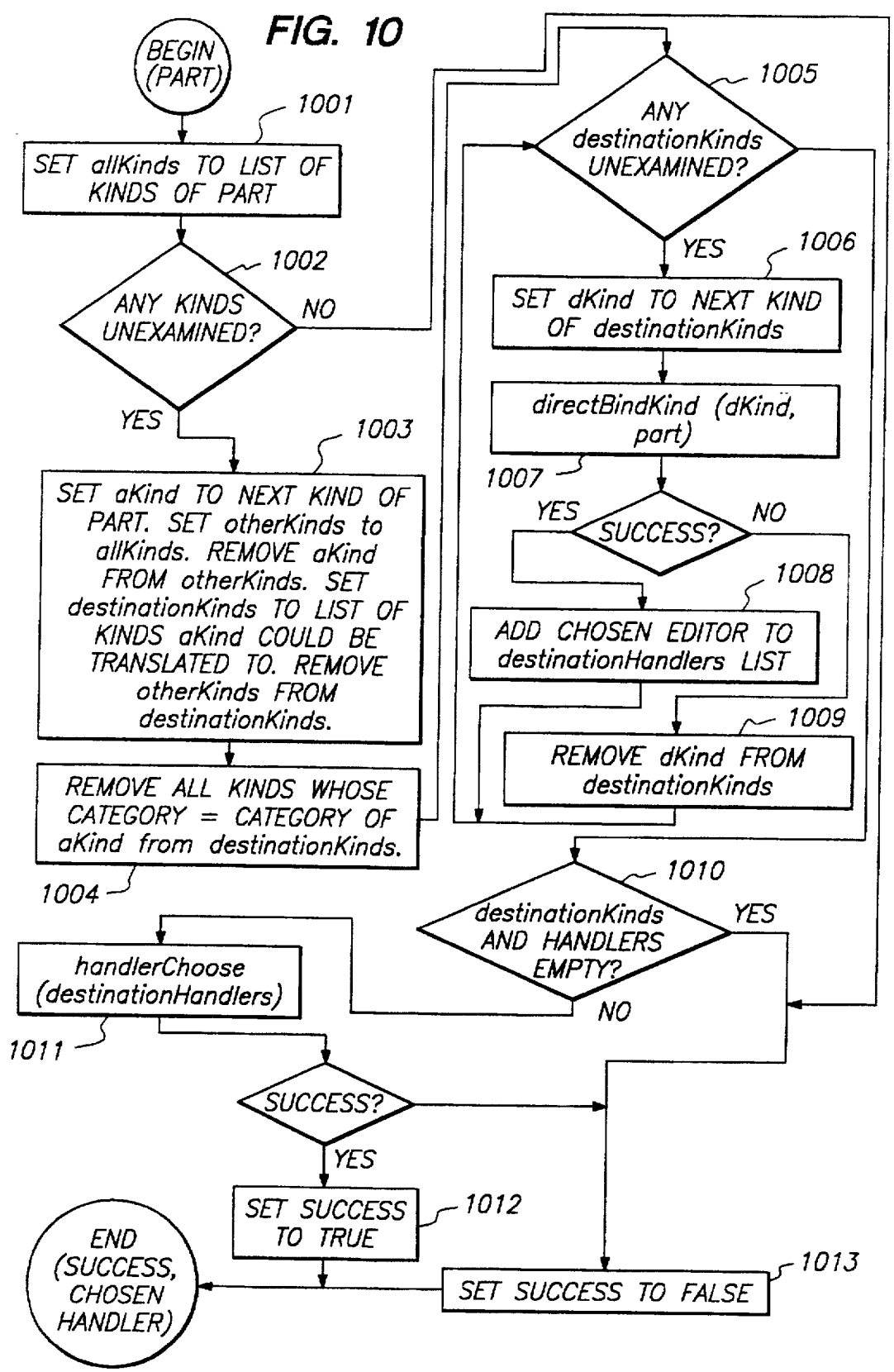
FIG. 10 is a flow chart of the subroutine for a translated binding in a non-selected category.

In the subroutine of Step 701, an attempt is made to locate an available handler that supports one of the categories associated with the part of interest. If that procedure is not successful, the subroutine of Step 705 attempts to locate an available handler based upon other categories of parts. Referring to FIG. 10, at Steps 1001–1003, one of the kinds for the part of interest is selected, a list of destination kinds for that selected kind is formed, and the other kinds are removed therefrom, similar to Steps 801–803. At Step 1004, the list of destination kinds has removed therefrom those kinds having an associated category which is the same as any of the categories associated with the selected kind. In other words, the process performed at Step 1004 is the complement of the procedure carried out at Step 804. Steps 1005–1009, which correspond to Steps 805–809, are then carried out to create a list of destination kinds and handlers. Thereafter, at Step 1010, a determination is made whether these lists are empty. If not, i.e., at least one destination handler has been located, one of the handlers is chosen at Step 1011, either arbitrarily or using any desirable technique, and the success flag is set at Step 1012. The process then returns to the flow chart of FIG. 7, where the chosen handler is bound to the part at Step 706. Thereafter, at Step 704, the destination kind which the chosen handler considers to have the highest fidelity is selected, and the part translated into that kind. The success flag is again set, and the process ends.

Otherwise, if no destination handler was chosen, the success flag is reset at Step 1013. Thereafter, the process returns to Step 204, where a determination is made that neither the Direct Binding routine nor the Translated Binding routine was successful in choosing a handler. Accordingly, the handler of last resort is bound to the part at Step 205.

In summary, therefore, the present invention provides a procedure for identifying the most suitable editor, or other handler, for a part, and binding that handler to the part. In a preferred mode of operation, an attempt is first made to bind a handler that is appropriate for one of the constituent kinds of the part, without having to translate the part. If the part's preferred editor exists on the underlying computer system, that editor is chosen. Otherwise, an editor is chosen based on a set of priorities. These priorities include editors from the document's restricted set of editors which handle that kind of part, system preferred editors for that kind of part, system preferred editors for the category of part which are also able to handle the kind of part, and any other editor which handles that kind of part. If none of these approaches are successful in selecting an editor, translation is employed. In this approach, an editor is identified for one of the kinds into which the part of interest can be translated and which is compatible with the category of the part. If no such editor can be found, an editor which is compatible with any other category of part is chosen. If no suitable editor is found to be available on the basis of these various criteria, a handler of last resort is bound to the part, to enable the part to be presented to the user on the system.

To facilitate an understanding of the invention, its principles have been explained with reference to a specific embodiment thereof. It will be appreciated, however, that the practical applications of the invention are not limited to this particular embodiment. For example, the various subroutines for locating a suitable handler, and the steps within those subroutines, need not be carried out in the specific order described herein. Suitable results can be achieved by examining the various criteria in different sequences of steps. The scope of the invention, therefore, is set forth in the following claims, rather than the foregoing description. All equivalents which are consistent with the meaning of the claims are intended to be embraced therein.

What is claimed:

1. In a computer system having a computer-human interface of the type in which documents are based upon parts, where each part comprises contents and a handler for those contents, and the contents are identified as belonging to at least one of plural different kinds of data, a method for binding a handler to a part, comprising the steps of:

automatically determining whether a handler is available on the computer system which is suitable for handling at least one of the kinds of data contained in the part, and binding the part to such a handler when one is determined to be available;

if no such handler is available, automatically determining other kinds of data to which the part can be translated;

automatically identifying a handler available on the system which is suitable for any of said other kinds of data;

translating the contents of the part into one of said other kinds of data for which the identified handler is suitable; and binding the translated part to the identified handler.

2. The method of claim 1 further including the steps of:

providing a handler of last resort which enables a part to be presented to a user of the computer system; and binding the part to said handler of last resort if no handler is available that is suitable for any of said other kinds of data.

3. The method of claim 1 wherein said step of determining whether a handler is available includes the steps of determining whether the part includes information identifying a preferred handler; and when a preferred handler is identified, determining whether such preferred handler is available on the computer system; and selecting such preferred handler for binding to the part when it is available.

4. The method of claim 3 wherein said step of determining whether a handler is available includes the further steps of providing a restricted set of handlers for the document containing the part, determining whether any of the handlers in said restricted set are suitable for a kind of data contained in the part, and selecting one of the handlers from said restricted set which is suitable for said kind of data.

5. The method of claim 4 wherein the contents of the part are associated with plural kinds of data each having a corresponding fidelity, and wherein one of said kinds is selected on the basis of its fidelity relative to that of the other kinds.

6. The method of claim 5 wherein the fidelity of each kind of data is determined by the handler which was last bound to the part.

7. The method of claim 5 further including the steps of determining whether the computer system contains an identification of a preferred handler for the selected kind of data, and selecting the preferred handler when it is identified and is available on the computer system.

8. The method of claim 7 wherein each kind of data is associated with at least one generic category of data, and further including the steps of:

identifying a category associated with the selected kind of data;

determining whether the computer system contains an identification of a preferred handler for that category of data;

if a preferred handler for the category is identified, determining whether that preferred handler is suitable for the selected kind of data; and selecting the preferred handler for the identified category if it is suitable for the selected kind of data.

9. The method of claim 8 further including the step of selecting a handler from any handler available on the computer system which is suitable for the selected kind of data if no system preferred handler is identified.

10. The method of claim 1 wherein the step of determining other kinds of data into which the part can be translated includes the steps of:

selecting one kind of data with which the contents of the part are associated;

determining a set of destination kinds of data into which the selected kind can be translated;

removing from said set all other kinds of data with which the contents of the part are associated;

determining one or more generic categories of data with which the selected kind is associated; and removing from said set all destination kinds which are not also associated with at least one of said categories of data.

11. The method of claim 10 wherein said step of identifying a handler includes the steps of:

locating handlers available on the computer system which are suitable for the destination kinds of data in said set;

determining whether any of the located handlers is suitable for at least one of said categories; and selecting a handler that is determined to be suitable.

12. The method of claim 11 further including the step of selecting a handler from any of said located handlers if none of said handlers is determined to be suitable for any of said categories.

13. The method of claim 1 wherein the step of translating the contents of the part includes the steps of determining a preferred order of fidelity for different kinds of data associated with the identified handler, and translating the contents of said part into the one of said other kinds of data which has the highest fidelity ordering for said identified handler.

14. In a computer system having a computer-human interface of the type in which documents are based upon parts, where each part comprises contents and a handler for those contents, and the contents are identified as belonging to at least one of plural different kinds of data each having a corresponding fidelity, a method for binding a handler to a part, comprising the steps of:

selecting one of said kinds of data for the part on the basis of its fidelity relative to that of the other kinds for the part;

determining whether the computer system contains an identification of a preferred handler for the selected kind of data;

selecting the preferred handler when it is identified and is available on the computer system; and binding the part to the selected handler.

15. The method of claim 14 further including the steps of providing a restricted set of handlers for the document containing the part, determining whether any of the handlers in said restricted set are suitable for the selected kind of data, and selecting one of the handlers from said restricted set which is suitable for said kind of data.

16. The method of claim 14 wherein the fidelity of each kind of data is determined by the handler which was last bound to the part.

17. The method of claim 14 wherein each kind of data is associated with at least one generic category of data, and further including the steps of:

identifying a category associated with the selected kind of data;

determining whether the computer system contains an identification of a preferred handler for that category of data;

if a preferred handler for the category is identified, determining whether that preferred handler is suitable for the selected kind of data; and selecting the preferred handler for the identified category if it is suitable for the selected kind of data.

18. The method of claim 17 further including the step of selecting a handler from any handler available on the computer system which is suitable for the selected kind of data if no system preferred handler has been identified.

19. In a computer system having a computer-human interface of the type in which documents are based upon parts, where each part comprises contents and a handler for those contents, and the contents are identified as belonging to at least one of plural different kinds of data, a method for translating a part from one kind into another kind and binding a handler to the translated part, comprising the steps of:

- selecting one kind of data with which the contents of the part are associated;
- determining a set of destination kinds of data into which the selected kind can be translated;
- removing from said set all other kinds of data with which the contents of the part are associated;
- determining one or more generic categories of data with which the selected kind is associated;
- removing from said set all destination kinds which are not also associated with at least one of said categories of data;
- locating handlers available on the computer system which are suitable for the destination kinds of data in said set;
- determining whether any of the located handlers is suitable for at least one of said categories;
- selecting a handler that is determined to be suitable;
- translating the contents of the part into one of said destination kinds of data for which the selected handler is suitable; and
- binding the translated part to the selected handler.

20. The method of claim 19 further including the step of selecting a handler from any of said located handlers if none of said handlers is determined to be suitable for any of said categories.

21. A system for binding a handler to an information part in a computer, comprising:

- a first data structure storing information which identifies handlers available within the computer and kinds of data with which each handler is associated;
- a second data structure which identifies kinds of data contained within a part;
- means for determining whether an available handler is associated with a kind of data contained in the part;
- means for binding a handler to the part if it is associated with a kind of data contained in the part;
- means for determining kinds of data into which the contents of the part can be translated;
- means for determining whether an available handler is associated with any of the kinds of data into which the contents of the part can be translated; and
- means for translating the contents of the part into a kind with which an available handler is associated.

22. The system of claim 21 further including means storing a handler of last resort which enables any part to be presented to a user of the computer, and means for binding said handler of last resort to the part if no available handler is associated with the kind of data contained in the part and the kinds of data into which the contents of the part can be translated.

23. The system of claim 21 wherein said second data structure identifies an order of fidelity for each kind of data contained in the part, and wherein said determining means sequentially selects the kinds of data contained in the part in order of their fidelity to determine whether an available handler is associated therewith.

24. The system of claim 23 wherein each kind of data is associated with at lest one generic category of data, and said determining means determines whether the computer contains information identifying a preferred handler for a category associated with the selected kind of data, and if so whether the preferred editor is associated with the selected kind.

25. The system of claim 21 wherein said translating means determines a preferred order of fidelity for different kinds of data associated with said available handler, and translates the contents of said part into the kind having the highest order of fidelity which is suitable for translation.

26. In a computer of the type having a computer-human interface in which documents are based upon parts, where each part comprises contents and a handler for those contents, a system for binding a handler to a part, comprising:

- a data structure which identifies the contents of a part as belonging to at least one of plural different kinds of data each having a corresponding fidelity;
- means for selecting one of said kinds of data for the part on the basis of its fidelity relative to those of other kinds for the part;
- means for determining whether the computer system contains a suitable handler for the selected kind of data; and
- means for binding the part to a suitable handler that is determined to be available.

27. The system of claim 26 wherein the fidelity of each kind of data is determined by the handler which was last bound to the part.

28. The system of claim 26 further including means storing information which associates each kind of data with at least one generic category of data;

- means for identifying a category associated with the selected kind of data;
- means for determining whether the computer contains a suitable handler for that category of data and, if a suitable handler for the category is available for determining whether that handler is suitable for the selected kind of data; and
- means for selecting the handler for the identified category to be bound to the part if it is suitable for the selected kind of data.

* * * * *